(12) United States Patent
Christensen et al.

(10) Patent No.: US 7,033,565 B2
(45) Date of Patent: Apr. 25, 2006

(54) PRODUCTION OF SULPHURIC ACID FROM A FEED GAS WITH VARYING CONCENTRATION OF SULPHUR DIOXIDE

(75) Inventors: Kurt Agerbæk Christensen, Birkerød (DK); Peter Schoubye, Hørsholm (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 10/912,169

(22) Filed: Aug. 6, 2004

(65) Prior Publication Data

US 2005/0036936 A1 Feb. 17, 2005

(30) Foreign Application Priority Data

Aug. 16, 2003 (DK) .................. 2003 01177

(51) Int. Cl.
*C01B 17/76* (2006.01)
*C01B 17/90* (2006.01)
(52) U.S. Cl. ............ 423/531; 423/243.01; 423/243.11; 423/522
(58) Field of Classification Search ................ 423/531, 423/243.01, 243.11, 522
See application file for complete search history.

(56) References Cited

U.S. PATENT DOCUMENTS

| | | | | |
|---|---|---|---|---|
| 1,823,372 A | * | 9/1931 | Merriam | 423/522 |
| 3,764,665 A | * | 10/1973 | Groenendaal et al. | 423/574.1 |
| 4,041,131 A | * | 8/1977 | Forbes | 423/243.11 |
| 4,213,958 A | * | 7/1980 | Cameron et al. | 423/522 |

FOREIGN PATENT DOCUMENTS

WO  WO 83/01438  4/1983

* cited by examiner

*Primary Examiner*—Stanley S. Silverman
*Assistant Examiner*—Ardith E Hertzog
(74) *Attorney, Agent, or Firm*—Dickstein Shapiro Morin & Oshinsky LLP

(57) ABSTRACT

A process for the production of sulphuric acid from a sulphur dioxide containing feed gas with concentration of $SO_2$ fluctuating between 0 and 100 mole % $SO_2$ comprising the steps of contacting the feed gas with an aqueous solution comprising 0–50% by weight $H_2SO_4$ at a temperature between the freezing point of said aqueous solution and 80° C.; and during the contact of the feed gas with the aqueous solution absorbing at least a part of $SO_2$ in the feed gas in the aqueous solution or desorbing at least a part of $SO_2$ from the aqueous solution, wherein the at least a part of $SO_2$ is desorbed by stripping the aqueous solution with the feed gas and passing at least part of the thus treated feed gas to a sulphuric acid plant.

7 Claims, 3 Drawing Sheets

PRODUCTION OF SULPHURIC ACID FROM A FEED GAS WITH VARYING CONCENTRATION OF SULPHUR DIOXIDE

BACKGROUND OF THE INVENTION

The present invention relates to a process for the production of sulphuric acid from sulphuric dioxide containing feed gas. More particularly, the invention is directed towards production of sulphuric acid with a feed gas having varying $SO_2$ concentrations by adjusting $SO_2$ concentration in the gas passed to a sulphuric acid plant through absorbing at least a part of $SO_2$ in the feed gas in the aqueous solution or desorbing at least a part of $SO_2$ from the aqueous solution.

Industrial off-gases containing $SO_2$ are typically treated in a sulphuric acid plant, where the $SO_2$ is oxidised to $SO_3$ and recovered as concentrated sulphuric acid. An example is the large-scale production of sulphuric acid from $SO_2$ containing off-gases from roasting and smelting of non-ferrous metal ores containing sulphides of e.g. Cu, Mo, Zn, Pb and Ni. Depending on the roasting and smelting process, these off-gases typically contain 1–40 mole % $SO_2$, 2–10 mole % water vapour, oxygen, carbon dioxide, nitrogen and a small amount of $SO_3$ in the form of sulphuric acid mist. However, the $SO_2$ concentration may vary considerably with time, especially if the upstream process is a batch operation, in which case the $SO_2$ concentration may fluctuate from zero in some periods of time to, say, 10–20 mole % in other time periods. Large variations in $SO_2$ concentration or gas flow will lead to great disturbances and control difficulties in a downstream sulphuric acid plant and furthermore require a plant designed for a much larger capacity than the average $SO_2$ flow.

From U.S. Pat. No. 3,764,665 a process is known for removing sulphur oxides from gas mixtures with a solid acceptor for sulphur oxides, wherein the solid acceptor is regenerated with a steam-diluted reducing gas and the regenerator off-gas is fed to a Claus sulphur recovery process. The regeneration off-gas is cooled and contacted with an $SO_2$-selective liquid such as water thereby absorbing the $SO_2$ from the gas. The $SO_2$-rich liquid is passed to a buffer zone of such a volume that the $SO_2$ concentration in the liquid in the buffer zone remains substantially constant. A stream of $SO_2$-rich liquid is withdrawn from the buffer zone and passed to a stripping zone, where the $SO_2$-rich liquid is heated to a temperature at which the $SO_2$ is expelled. By operating in this manner, fluctuations in the $SO_2$ concentration of the regeneration off-gas are levelled out and a relatively concentrated $SO_2$ stream is obtained at a substantially constant rate.

A similar process for sulphuric acid production from process gas containing $SO_2$ obtained from discontinuous processes is known from EP patent No. 091,938. According to this process, part of the $SO_2$ in the feed gas is separated to form a liquid phase during periods in which process gas containing $SO_2$ is generated in an upstream process, while the remaining $SO_2$ in the gas is passed to a sulphuric acid plant. During those periods in which no process gases are produced, the stored $SO_2$ containing liquid is passed to a stripping step where $SO_2$ is stripped from the liquid with the aid of a carrier gas and passed to the sulphuric acid plant.

Disadvantages of the processes of U.S. Pat. No. 3,764,665 and EP patent No. 091,938 are the complexity of the process, which requires separate absorption and stripping steps.

DESCRIPTION OF THE INVENTION

The invention makes use of combined absorption and desorption operation in the continuous production of sulphuric acid from a sulphur dioxide ($SO_2$) containing feed gas, wherein $SO_2$ concentrations fluctuates considerably during operation of the process by treating the feed gas in a single combined absorption/stripping step with an aqueous solution of $SO_2$ in diluted sulphuric acid with 0–50% by weight of $H_2SO_4$.

Thereby, a feed gas containing $SO_2$ is treated with a diluted aqueous solution of $SO_2$ leading to absorption or stripping of $SO_2$ according to

An insignificant part of the sulphurous acid $H_2SO_3$ will dissociate according to

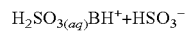

The equilibrium vapour pressure of $SO_2$ above an aqueous solution of $SO_2$ containing 1 g $SO_2$/litre is approximately 0.01 atm at 30° C. The equilibrium vapour pressure increases with increasing temperature and is approximately proportional to the $SO_2$ concentration in the liquid. The principle feature of the process according to the present invention is that $SO_2$ is absorbed in the liquid, when the $SO_2$ partial pressure in the feed gas is higher than the $SO_2$ equilibrium vapour pressure over the liquid. On the other hand, when the $SO_2$ partial pressure in the feed gas is lower than the $SO_2$ equilibrium vapour pressure over the liquid, $SO_2$ is stripped from the liquid. Thereby, fluctuations in $SO_2$ concentration in the feed gas are damped and if volume of liquid in the absorber/stripper is sufficiently large, the $SO_2$ concentration in the exit gas will be substantially constant.

Based on the above observations, the invention is a process for the production of sulphuric acid from a sulphur dioxide containing feed gas with concentration of $SO_2$ fluctuating between 0 and 100 mole % $SO_2$ comprising the steps of treating the feed gas with an aqueous solution comprising 0–50% by weight $H_2SO_4$ at a temperature between the freezing point of said aqueous solution and 80° C.; during treating of the feed gas with the aqueous solution absorbing at least a part of $SO_2$ in the feed gas in the aqueous solution or desorbing at least a part of $SO_2$ from the aqueous solution, wherein the at least a part of $SO_2$ is desorbed by stripping the aqueous solution with the feed gas; and passing at least part of the thus treated feed gas to a sulphuric acid plant. The ratio between the feed gas flow in $Nm^3/h$ and volume of the aqueous solution is preferably from about 2–40 $Nm^3/h$ per $m^3$ of aqueous solution.

An advantage of the above process according to the present invention is that no separate process control of the absorption and stripping modes is necessary because the feed gas is used also for stripping of $SO_2$. When employing combined absorption and stripping of $SO_2$ contained in the feed gas stream, the operation by itself will average the $SO_2$ content in the gas passed to the sulphuric acid plant.

In the following, two preferred embodiments of the invention are described with reference to the drawings, in which FIG. 1 is a simplified flow sheet of combined absorption-stripping of $SO_2$ containing feed gas according to the invention;

Figure 1:
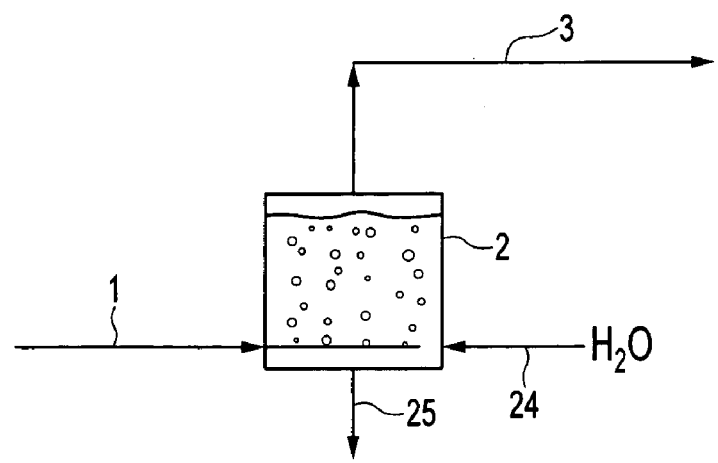

Referring to FIG. 1, a feed gas in line 1 with fluctuating concentration of $SO_2$ is bubbled through an absorber/stripper tank 2 with a dilute aqueous solution of $SO_2$. The $SO_2$ concentration fluctuations in the product gas stream 3 are significantly damped compared to the inlet fluctuations. Preferable, the time-averaged $SO_2$ concentration of the feed gas stream is 0.5–40 mole %. The absorber/stripper may be a tank with a gas distributor, a packed tower with a large liquid hold-up in the tower or in a separate vessel, a tray column or other similar contacting equipment with a large liquid hold-up. The extent of damping of the fluctuations is determined by the $SO_2$ solubility in the liquid and the volume of liquid in the absorber/stripper. The damping increases with decreasing temperature, increasing pressure and increasing liquid volume in the tank. The temperature in the absorber/stripper is between the freezing point of the diluted $SO_2$ solution and 80° C., preferably 20–50° C. and the pressure in the absorber/stripper is 1–10 atm, preferably 1–3 atm absolute.

Depending on the water vapour concentration in the feed gas in line 1 and the temperature in the absorber/stripper, water will condense or evaporate in the absorber/stripper. If the water concentration in the feed gas is so low that water evaporates from the absorber/stripper, the liquid volume in the absorber/stripper can be maintained constant by adding water in line 24. If water condenses in the absorber/stripper, a liquid purge in line 25 can be used to maintain the liquid level constant. Alternatively, the absorber/stripper can be equipped with liquid recirculation and cooling, in which case a liquid level control can be used to adjust the temperature. In another alternative embodiment, the feed gas is treated with the aqueous solution in an absorption/stripping tower and the aqueous solution is recycled in a loop comprising a tank containing the recycling solution.

A fraction of the small amount of sulphuric acid mist typically present in $SO_2$-containing gas mixtures will be captured in the absorber/stripper. Furthermore, $SO_2$ dissolved in the absorption liquid will be slowly oxidised to sulphuric acid by oxygen being present in the feed gas according to the following reaction:

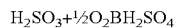

$H_2SO_3+½O_2BH_2SO_4$

Both sulphuric acid mist and $SO_2$ oxidation in the liquid result in increasing sulphuric acid concentration in the absorber/stripper liquid, which will lead to lower $SO_2$ solubility and lower water vapour pressure over the liquid.

Another preferred embodiment of the invention is described in the following with reference to FIG. 2. This embodiment, which is preferred for long-term steady state operation, includes a liquid purge from the absorber/stripper. The feed gas in line 1 with fluctuating concentration of $SO_2$ is bubbled through an absorber/stripper tank 2 with a dilute aqueous solution of $SO_2$. The $SO_2$ concentration fluctuations in the product gas stream 3 are significantly damped compared to the inlet fluctuations. The temperature of the absorber/stripper is controlled by recirculation and cooling of a liquid flow in line 4 by means of a pump 5 and a cooler 6. A purge stream in line 7 is passed to an evaporator 8, in which $SO_2$ and most of the water are stripped off by heat exchange with steam in line 9. The liquid is recirculated by means of the pump 10 and the gas and liquid phases are separated in the separator 11. The liquid product from the evaporator in line 12 is typically 60–80 wt % $H_2SO_4$. The temperature in the separator 11 is typically 70–170° C., preferably 80–130° C. and the pressure in the separator is typically 0.05–1 atm, preferably 0.05–0.2 atm. For operation at 103° C. and 0.1 atm, the liquid product is 70 wt % $H_2SO_4$ with about 0.5–2 ppm by wt. of $SO_2$, while the water vapour phase contains substantially all $SO_2$ and about 1 ppm by vol. of $H_2SO_4$ vapour. The gas phase from the evaporator in line 13 is passed to a partial condenser 14, in which a fraction of the water is condensed. The cooling duty of the partial condenser 14 is adjusted to a value, where typically 50–95%, preferably 80–90% of the water vapour flow to the condenser 14 is recovered in line 15. The water stream in line 15 typically contains 20–200 ppm by wt. of dissolved $SO_2$. The vapour phase from the partial condensation step is pumped by means of a vacuum pump 16 and mixed with the main gas flow from the absorber/stripper and sent to the sulphuric acid plant via line 17.

Since the process according to the invention will typically be applied to wet gases, water will condense in the cooled absorber/stripper and in this case, the purge flow in line 7 is preferably controlled by the liquid level in the absorber/stripper. If the absorber/stripper is operated at high temperature, water can be added in line 18 to the absorber/stripper to compensate for water evaporation. The volume of the aqueous solution is kept constant by purging a volume of a solution being formed by net condensation of water from the feed gas concentration and/or by adding such a volume of water to the solution in such an amount so that the concentration of $H_2SO_4$ in the aqueous solution is maintained at a predetermined value, preferably between 2% and 10% by weight $H_2SO_4$.

Figure 2:
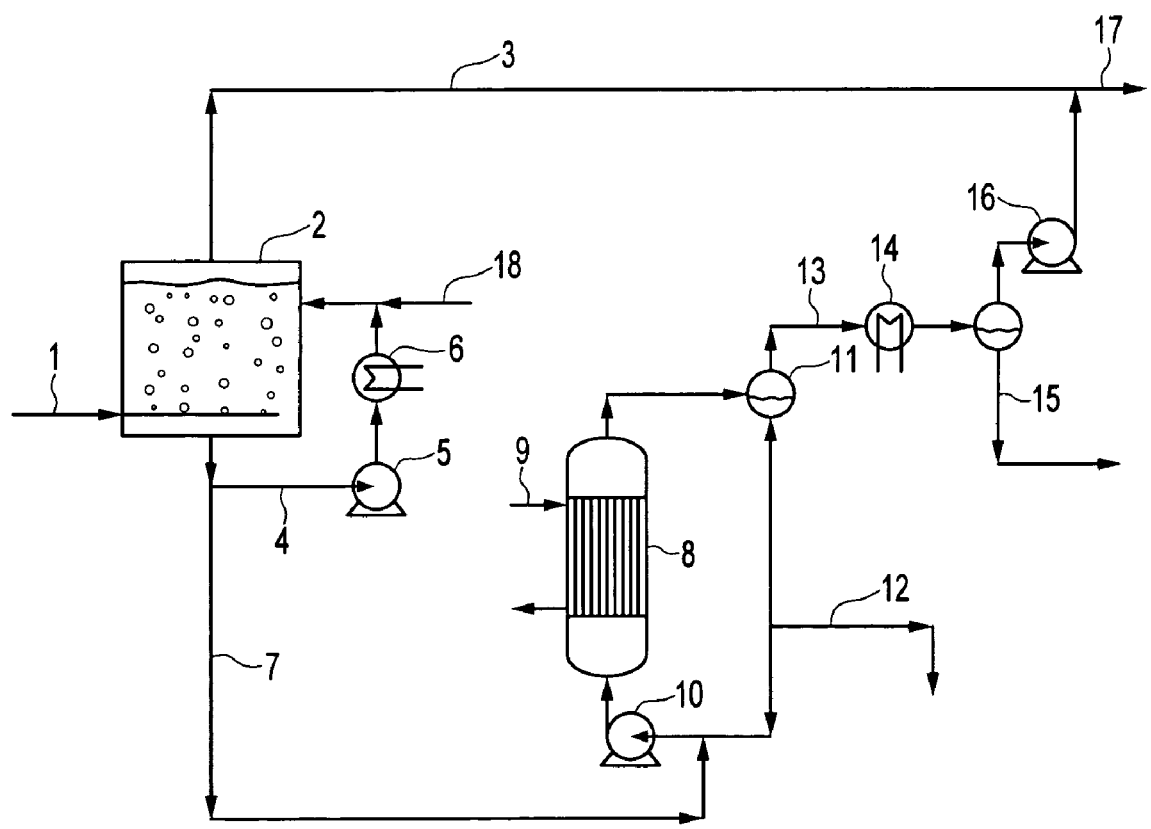
FIG. 2 is a simplified flow sheet showing the above combined absorption-stripping operation and treatment of a purge stream for further recovery of $SO_2$ and sulphuric acid.

As an alternative to the separation system shown in FIG. 2, the purge stream from the absorber/stripper may be treated in a wastewater treatment facility.

EXAMPLE

Figure 3:
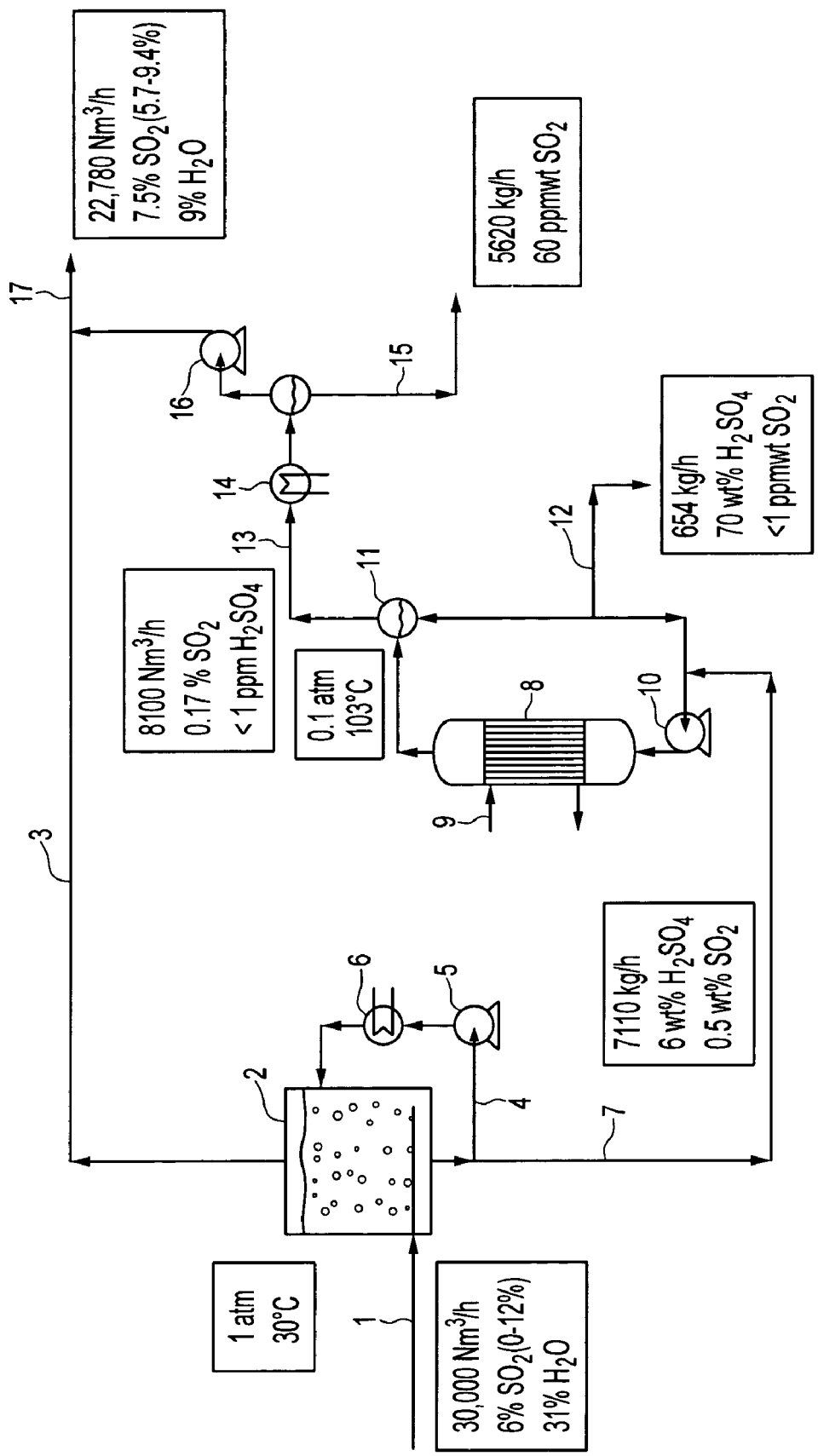
FIG. 3 shows the flow sheet of FIG. 2 with a summary of process conditions and results for the different unit operation of a process according to a specific embodiment of the invention.
Figure 4:
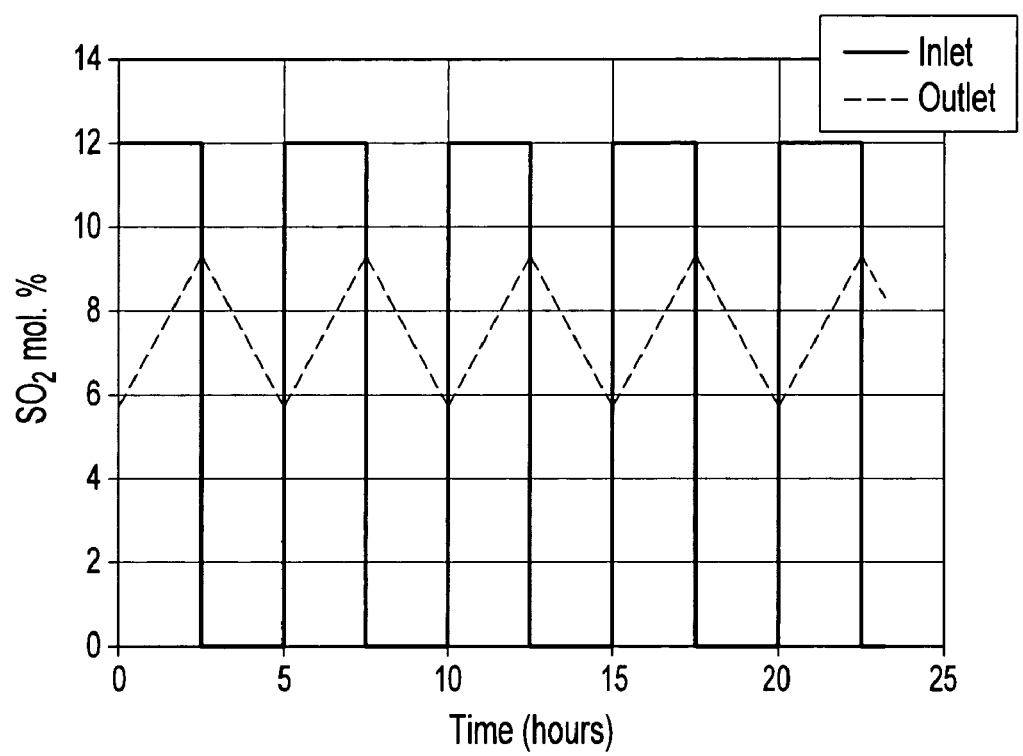
FIG. 4 is a graphical depiction of $SO_2$ concentration at inlet and outlet of the combined absorption and stripping operation.

An example of the use of a specific embodiment of the invention is given in the following with reference to FIG. 3, which shows the time-averaged flow sheet and FIG. 4, which shows the $SO_2$ concentration in the feed gas to the process in line 1 (inlet) and in the effluent gas in line 17 (outlet). The $SO_2$ concentration in 30.000 Nm³/h feed gas from a batch smelting process fluctuates from 0–12 mole % $SO_2$ in a 5 hour cycle with 12% $SO_2$ for 2½ hours and no $SO_2$ for 2½ hours as shown in FIG. 4. The feed gas is contacted with 5000 m³ of liquid at 1 atm and 30° C. in the absorber/stripper tank 2 thereby damping the fluctuations. Due to water condensation in the absorber/stripper, a purge flow of 7110 kg/h liquid with 6 wt % $H_2SO_4$ and 0.5 wt % dissolved $SO_2$ is drawn from the tank and passed via line 7 to the evaporator 8. In the evaporator, 8100 Nm³/h water vapour with 0.17% $SO_2$ and less than 1 ppm $H_2SO_4$ is stripped from the liquid to line 13 at 0.1 atm and 103° C. The liquid product in line 12 is 654 kg/h 70 wt % sulphuric acids with less than 1 ppm by wt. of dissolved $SO_2$. The gas phase from the evaporator in line 13 is passed to a partial condenser 14, in which 5620 kg/h water with 60 ppm by wt. of dissolved $SO_2$ is condensed by adjusting the cooling water flow to the partial condenser to yield 4000 kW cooling duty. The 1110 Nm³/h effluent gas from the condenser, which contains more than 99% of the $SO_2$ dissolved in line 7 is mixed with the main gas flow from the absorber/stripper and sent to the sulphuric acid plant via line 17. The fluctuations in the mixed gas streams in line 17 are reduced by this process to 5.7–9.4 vol % $SO_2$ as shown in FIG. 4.

What is claimed as new and desired to be protected by Letters Patent of the United States is:

1. A process for the production of sulphuric acid from a sulphur dioxide containing feed gas with concentration of $SO_2$ fluctuating between 0 and 100 mole% $SO_2$ comprising the steps of treating the feed gas with an aqueous solution of diluted sulphuric acid comprising 0–50% by weight $H_2SO_4$ at a temperature between the freezing point of said aqueous solution and 80° C.; during treating of the feed gas with the aqueous solution absorbing at least a part of $SO_2$ in the feed gas in the aqueous solution or desorbing at least a part of $SO_2$ from the aqueous solution, wherein the at least a part of $SO_2$ is desorbed by stripping the aqueous solution with the feed gas; and passing at least part of the thus treated feed gas to a sulphuric acid plant.

2. The process of claim 1, wherein the time-averaged $SO_2$ concentration of the feed gas stream is 0.5–40 mole %.

3. The process of claim 1, wherein the feed gas is treated with the aqueous solution in an absorption/stripping tower and the aqueous solution is recycled in a loop comprising a tank containing the recycling solution.

4. The process of claim 1, wherein the ratio between the feed gas flow in $Nm^3/h$ and volume of the aqueous solution is 2–40 $Nm^3/h$ per $m^3$ of aqueous solution.

5. The process of claim 1, wherein the volume of the aqueous solution is kept constant by purging a volume of a solution being formed by net condensation of water from the feed gas concentration and/or by adding such a volume of water to the solution in such an amount so that the concentration of $H_2SO_4$ in the aqueous solution is maintained at a predetermined value.

6. The process of claim 5, wherein the volume of the aqueous solution being purged is passed to a regeneration step in which the purged volume is separated into a stream of more concentrated sulphuric acid with a higher concentration than in the aqueous solution, a stream of concentrated $SO_2$ gas and a stream of water.

7. The process of claim 5, wherein the concentration of $H_2SO_4$ in the aqueous solution is maintained between 2% and 10% by weight $H_2SO_4$.

* * * * *